(12) United States Patent
Piercy et al.

(10) Patent No.: US 8,271,040 B2
(45) Date of Patent: Sep. 18, 2012

(54) NETWORK ELEMENT AND METHOD FOR SETTING A POWER LEVEL IN A WIRELESS COMMUNICATION SYSTEM

(75) Inventors: Neil Philip Piercy, Royston (GB); Akhilesh Pokhariyal, Isleworth (GB); Nicholas Dougall Johnson, San Francisco, CA (US)

(73) Assignee: IP. Access Limited, Cambridgeshire (GB)

( * ) Notice: Subject to any disclaimer, the term of this patent is extended or adjusted under 35 U.S.C. 154(b) by 473 days.

(21) Appl. No.: 12/526,893

(22) PCT Filed: Feb. 11, 2008

(86) PCT No.: PCT/EP2008/051607
§ 371 (c)(1),
(2), (4) Date: Feb. 3, 2010

(87) PCT Pub. No.: WO2008/098898
PCT Pub. Date: Aug. 21, 2008

(65) Prior Publication Data
US 2010/0151870 A1   Jun. 17, 2010

(30) Foreign Application Priority Data

Feb. 12, 2007   (GB) .................................. 0702708.9
Feb. 12, 2007   (GB) .................................. 0702709.7

(51) Int. Cl.
*H04B 7/00* (2006.01)
(52) U.S. Cl. ...................... 455/560; 455/522; 455/67.11

(58) Field of Classification Search .................... None
See application file for complete search history.

(56) References Cited

U.S. PATENT DOCUMENTS

| 2001/0055298 | A1 | 12/2001 | Baker et al. | |
| 2004/0156328 | A1* | 8/2004 | Walton et al. | 370/313 |
| 2004/0166886 | A1 | 8/2004 | Rajiv et al. | |
| 2004/0242257 | A1* | 12/2004 | Valkealahti et al. | 455/522 |
| 2011/0170432 | A1* | 7/2011 | Grokop et al. | 370/252 |

FOREIGN PATENT DOCUMENTS

| EP | 1667358 | 6/2006 |
| WO | WO03036815 | 5/2003 |
| WO | WO 2004/077685 | 9/2004 |
| WO | WO2005/006798 | 1/2005 |

* cited by examiner

*Primary Examiner* — Erika Gary
(74) *Attorney, Agent, or Firm* — Price Heneveld LLP

(57) ABSTRACT

A network element (230) for communicating with a wireless communication unit (214) in a communication cell (200) of a communication system (200) comprises a receiver arranged to perform a frequency sweep across a plurality of operational frequencies. Signal processing logic (255), operably coupled to the receiver, processes the received signals from the frequency sweep and providing an estimate of a level of interference at a number of frequency carriers of the swept frequencies. The signal processing logic (255) is capable of determining whether a transmit power level at a frequency selected from the processed frequency sweep satisfies at least one predetermined quality criterion of the communication system (200). A transmitter (270) is arranged, upon initial activation of the network element (230), to transmit to a wireless communication unit at the determined transmit power level.

10 Claims, 4 Drawing Sheets

FIG. 1 - Prior Art

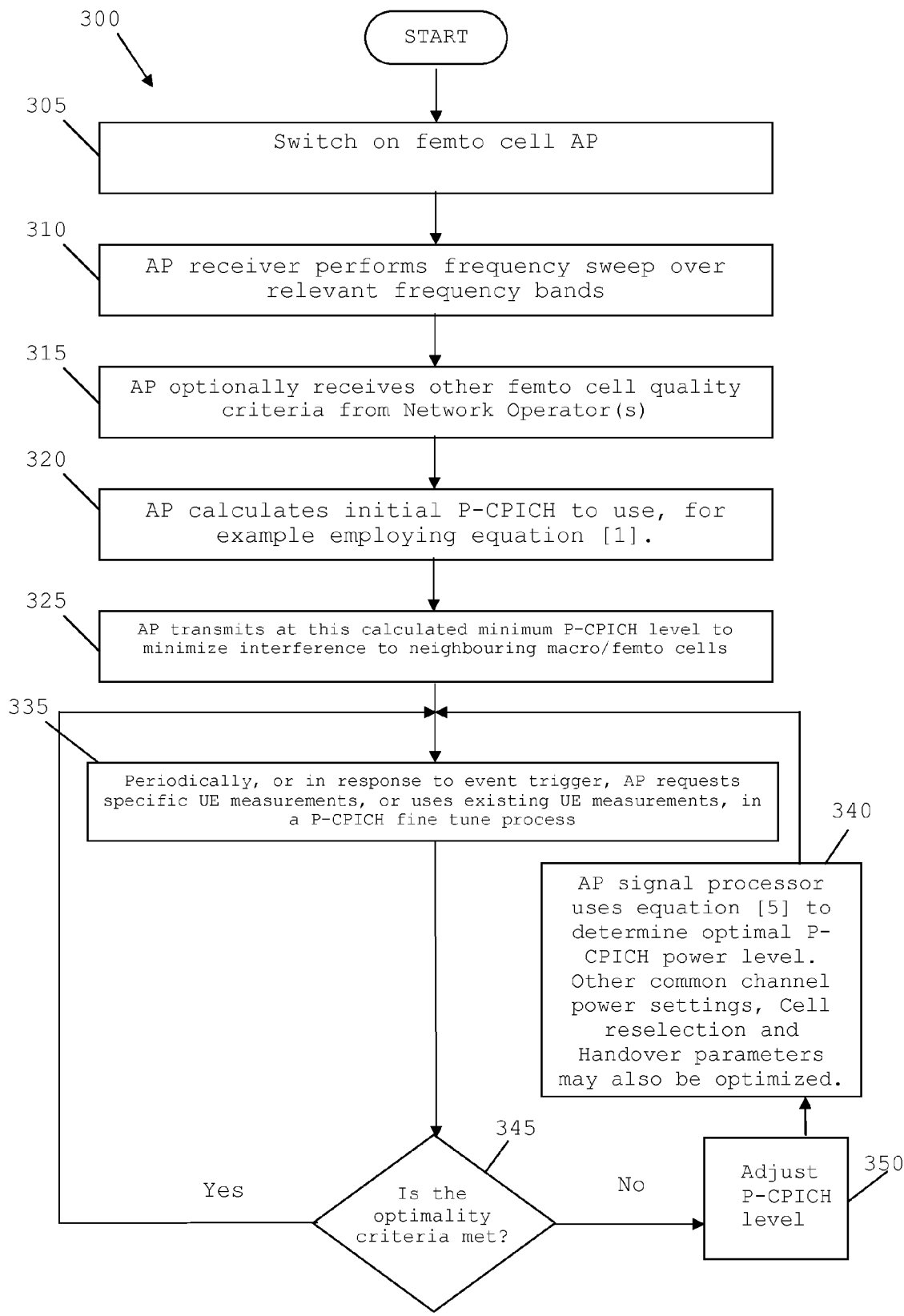

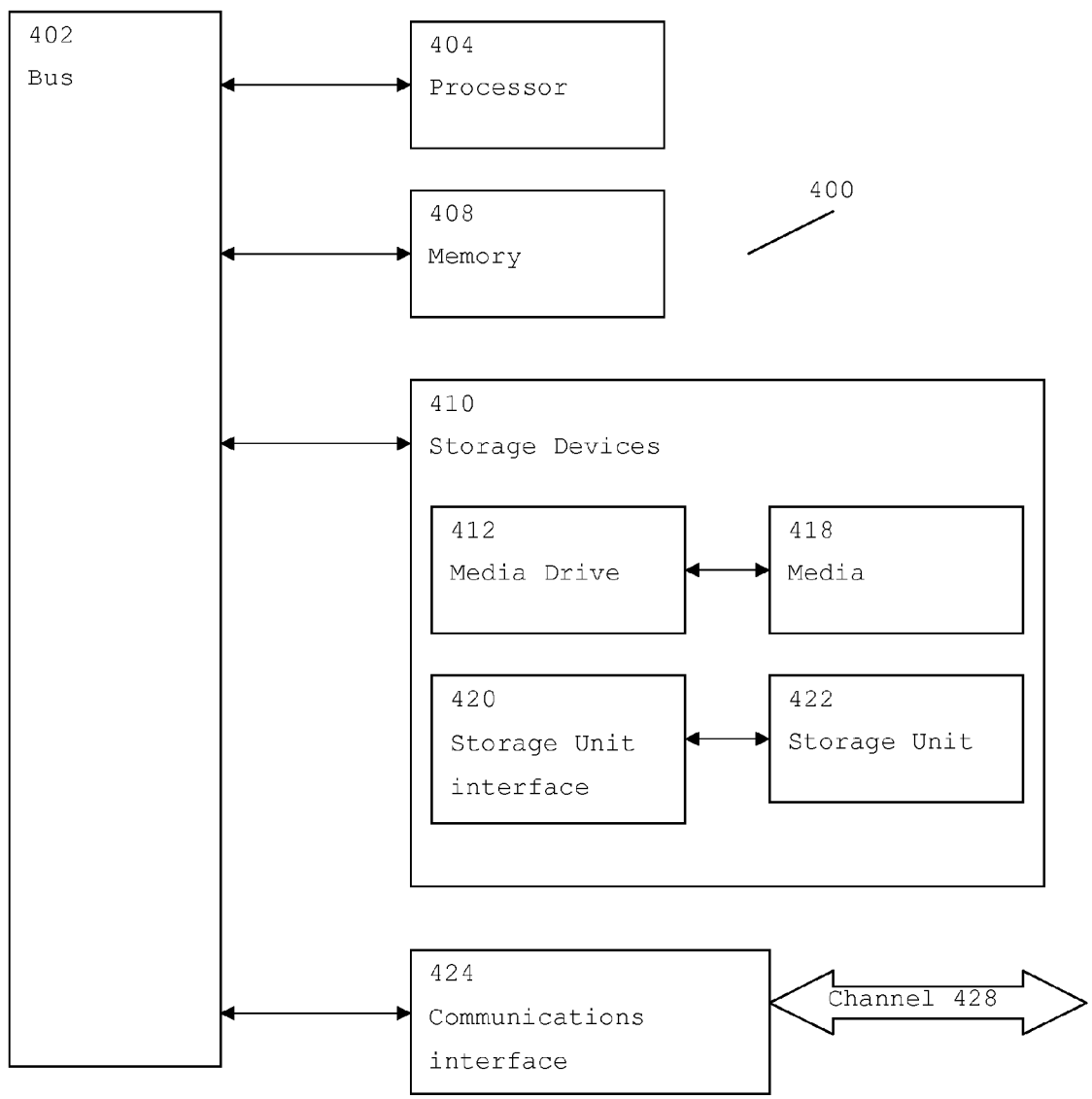

NETWORK ELEMENT AND METHOD FOR SETTING A POWER LEVEL IN A WIRELESS COMMUNICATION SYSTEM

FIELD OF THE INVENTION

The field of the invention relates to a cellular communication system, a communication network element and a method for setting a power level therein. In particular, the field of the invention relates to a network element and method for setting a power level in a wireless communication system that comprises femto-cells and macro-cells.

BACKGROUND OF THE INVENTION

Wireless communication systems, such as the $3^{rd}$ Generation (3G) of mobile telephone standards and technology, are well known. An example of such 3G standards and technology is the Universal Mobile Telecommunications System (UMTS), developed by the $3^{rd}$ Generation Partnership Project (3GPP) (www.3gpp.org).

Typically, wireless communication units, or User Equipment (UE) as they are often referred to in 3G parlance, communicate with a Core Network (CN) of the 3G wireless communication system via a Radio Network Subsystem (RNS). A wireless communication system typically comprises a plurality of radio network subsystems, each radio network subsystem comprising one or more cells to which UEs may attach, and thereby connect to the network.

The $3^{rd}$ generation of wireless communications has been developed for macro-cell mobile phone communications. Such macro cells utilise high power base stations (NodeBs in 3GPP parlance) to communicate with UEs within a relatively large coverage area.

Lower power (and therefore smaller coverage area) femto-cells or pico-cells are a recent development within the field of wireless cellular communication systems. Femto-cells or pico-cells (with the term femto-cells being used hereafter to encompass pico-cells or similar) are effectively communication coverage areas supported by low power base stations (otherwise referred to as Access Points (APs)). These cells are able to be piggy-backed onto the more widely used macro-cellular network and support communications to UEs in a restricted, for example 'in-building', environment. Typical applications for such femto-cell APs include, by way of example, residential and commercial (e.g. office) locations, 'hotspots', etc, whereby an AP can be connected to a core network via, for example, the Internet using a broadband connection or the like. In this manner, femto-cells can be provided in a simple, scalable deployment in specific in-building locations where, for example, network congestion at the macro-cell level may be problematic.

In a femto cell network it is known that there may be a very large number of femto cells compared to the number of macro cells, with femto cells often residing within or overlapping macro cells in the same geographic area.

Thus, the coverage area of a single macro cell will inevitably overlap (and encompass) a coverage area of a large number of femto cells.

In a planned macro cell network, a so-called neighbour cell list is used to identify adjacent cells to each macro cell, to facilitate handover of UE communications between cells. The neighbour cell list is broadcast to roaming UEs via NodeBs to enable the roaming UE to receive and assess the suitability of continuing a communication by transferring the communication to an adjacent (neighbour) cell. The neighbour cell list of the macro cell contains frequency and scrambling code information for all of the cells whose coverage area overlaps with the macro cell, to allow the UE to be able to receive and decode transmissions from the neighbouring cells.

In the same manner as for current macro cell systems, a downlink coverage area of a wideband code division multiple access (WCDMA) based femto cell is dependent on the power level of the Primary Common Pilot Channel (P-CPICH) relative to the surrounding interference level.

However, it is anticipated that femto cells will generally experience more diverse radio frequency (RF) environments, due to their anticipated in-building usage as well as their increased dependency upon factors such as distance to neighbouring macro cells/femto cells, thereby number of interfering neighbour cells, respective power levels of neighbouring macro/femto cells, floor-plan and materials used in the construction of the building in which the femto cell is located, etc.

The P-CPICH power setting in traditional macro cells is determined by centralized radio network planning, as illustrated in the flowchart 100 of FIG. 1, and as described in J. Laiho et. al., "Radio Network Planning and Optimisation for UMTS", second edition, John Wiley & Sons, Ltd, ISBN-10 0-470-01575-6. This central pre-planning is often supplemented using techniques such as 'drive-by' testing. Referring now to FIG. 1, a flowchart 100 of a known process to set a P-CPICH power level in a 3GPP macro-cell network is illustrated.

In a macro cell network, the process comprises obtaining a set of network parameters, for example number of sites, terrain information, anticipated cell loads, quality of service (QoS) parameters, etc. as shown in step 105. Once the network parameters have been obtained in step 105, a potential cell site location is selected, as shown in step 110. The network parameters according to a cell site positioned in the selected location is then modelled to identify its radio network performance, as shown in step 115. The network model is then run a number of times to identify whether an optimal performance can be achieved with iterative changes to the network parameters or proposed cell site location, as shown in step 120.

If a suitably optimal performance is not achieved, for example the level of performance does not exceed a number of target thresholds, one or more network parameters are again modified, as shown in step 125, and the process loops back to step 110.

However, if a suitably optimal performance is achieved in step 120, a P-CPICH power level is set, as shown in step 130. Thereafter, network higher layer measurements may be taken and applied to the model as shown in step 135. Alternatively, or additionally, drive-by testing may be performed when the macro/micro system goes 'live', as shown in step 140. Measurements taken during the drive-by testing may then optionally also be applied to the Network model, as shown in step 145. In this manner, by supplementing the modelled nature of the macro/micro cell site with drive-by data, the Network Operator is able to check that the performance of the real-life system accurately reflects the modelled performance.

At present centralized radio network planning and techniques such as drive-by testing are utilized for the tuning of the P-CPICH power in the macro/micro cells, but will be unusable in a femto cell scenario. It is envisaged by the inventors of the present invention that some form of auto-provisioning of femto cells may be desirable from a Network Operator's perspective, especially in a large scale deployment of femto cells.

Thus, there exists a need for a wireless communication system, a network element and method for setting a power level in the wireless communication system, particularly in a system that combines macro-cell and femto-cells, which aims to address at least some of the shortcomings of past and present techniques.

SUMMARY OF THE INVENTION

Accordingly, the invention seeks to mitigate, alleviate or eliminate one or more of the abovementioned disadvantages singly or in any combination.

According to a first aspect of the invention, there is provided a network element for communicating with a wireless communication unit in a communication cell of a communication system. The network element comprises a receiver arranged to receive at least one signal quality measurement from at least one wireless communication unit. Signal processing logic is arranged to process the at least one signal quality measurement and use a knowledge of a number of unauthorized attempts to access the communication system via the network element. In response thereto, the signal processing logic is arranged to determine whether a transmission at a transmit power level satisfies at least one predetermined quality criterion of the communication system and arrange for regularly tuning of a transmit power level of transmissions to a wireless communication unit at the determined transmit power level.

By using a knowledge of a number of unauthorized attempts to access the communication system via the network element, the network element includes in the determination of a suitable power level setting an indication of whether wireless communication units located outside of a desired cell boundary, for example a building, have attempted to access the communication cell.

In one optional embodiment of the invention, regular tuning of a transmit power level of transmissions may comprise at least one of: periodically tuning a transmit power level; intermittently tuning a transmit power level; tuning a transmit power level in response to an event. In this manner, a continuous 'fine-tuning' process of the cell's transmit power level can be achieved, to adapt for varying RF conditions prevalent within the communication cell.

In one optional embodiment of the invention, the transmitter may be arranged to transmit a request to the wireless communication unit for the wireless communication unit to perform and transmit the at least one signal quality measurement, for example a signal-to-noise (Ec:No) measurement, to the network element. In this manner, the network element may be able to determine whether to adjust a transmit power level by specifically requesting one or more wireless communication units to transmit signal quality criteria that represents their particular radio frequency environment at their geographical location. Thus, the network element may then adjust the transmit power level to assist the wireless communication unit's receiver and decoding process, as well as maintain a minimum interference on neighbouring cells.

In one optional embodiment of the invention, the power level setting may be at least one of: a Primary Common Pilot Channel (P-CPICH) power level, for example employed in a femto cell of a communication system that supports both planned macro cells and un-planned femto cells, an acquisition indicator channel (AICH), a paging indicator channel (PICH), a cell selection parameter, cell re-selection parameter, such as a Minimum Required Quality Level (Qqualmin), Minimum Required Received Level (Qrxlvemin), at least one handover parameter.

According to a second aspect of the invention, there is provided a method for setting a power level for transmissions in a communication cell of a cellular communication system.

The method comprises receiving at least one signal quality measurement from at least one wireless communication unit operational in the cellular communication system; processing the at least one signal quality measurement and using a knowledge of a number of unauthorized attempts to access the communication system via the network element. In response to the steps of processing and using, the method further comprises determining whether a transmission at a transmit power level satisfies at least one predetermined quality criterion of the communication system; and regularly tuning a transmit power level of transmissions to a wireless communication unit at the determined transmit based on the determined transmit power level.

According to a third aspect of the invention, there is provided a computer-readable storage element. The computer-readable storage element has computer-readable code stored thereon for programming signal processing logic to perform a method for setting a power level for transmissions in a communication cell of a cellular communication system in accordance with the aforementioned third aspect.

These and other aspects, features and advantages of the invention will be apparent from, and elucidated with reference to, the embodiments described hereinafter.

Figure 1:
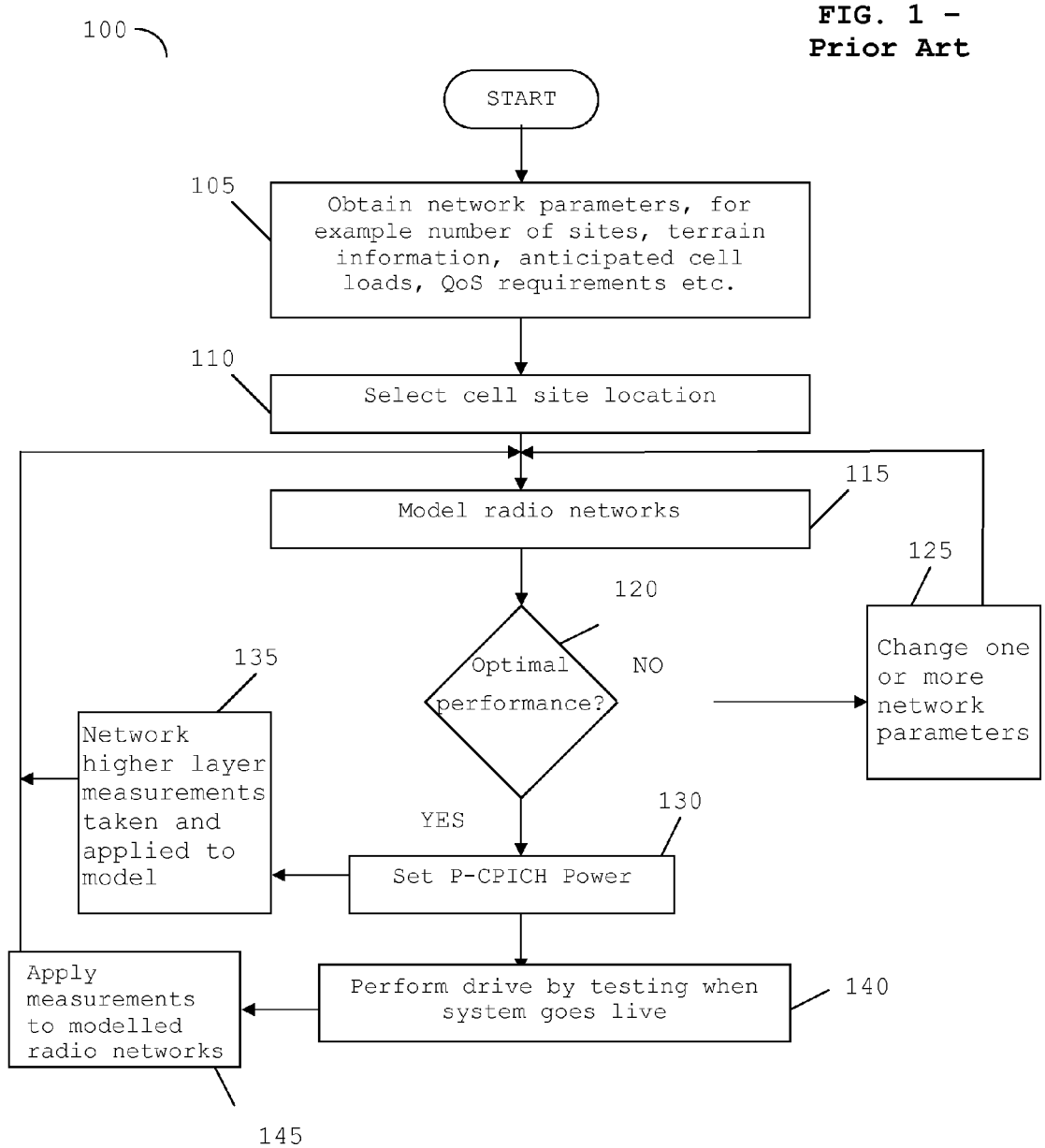
FIG. 1 illustrates a flowchart of a known method for setting a P-CPICH power level in a macro-cell 3GPP wireless cellular communication system.
Figure 2:
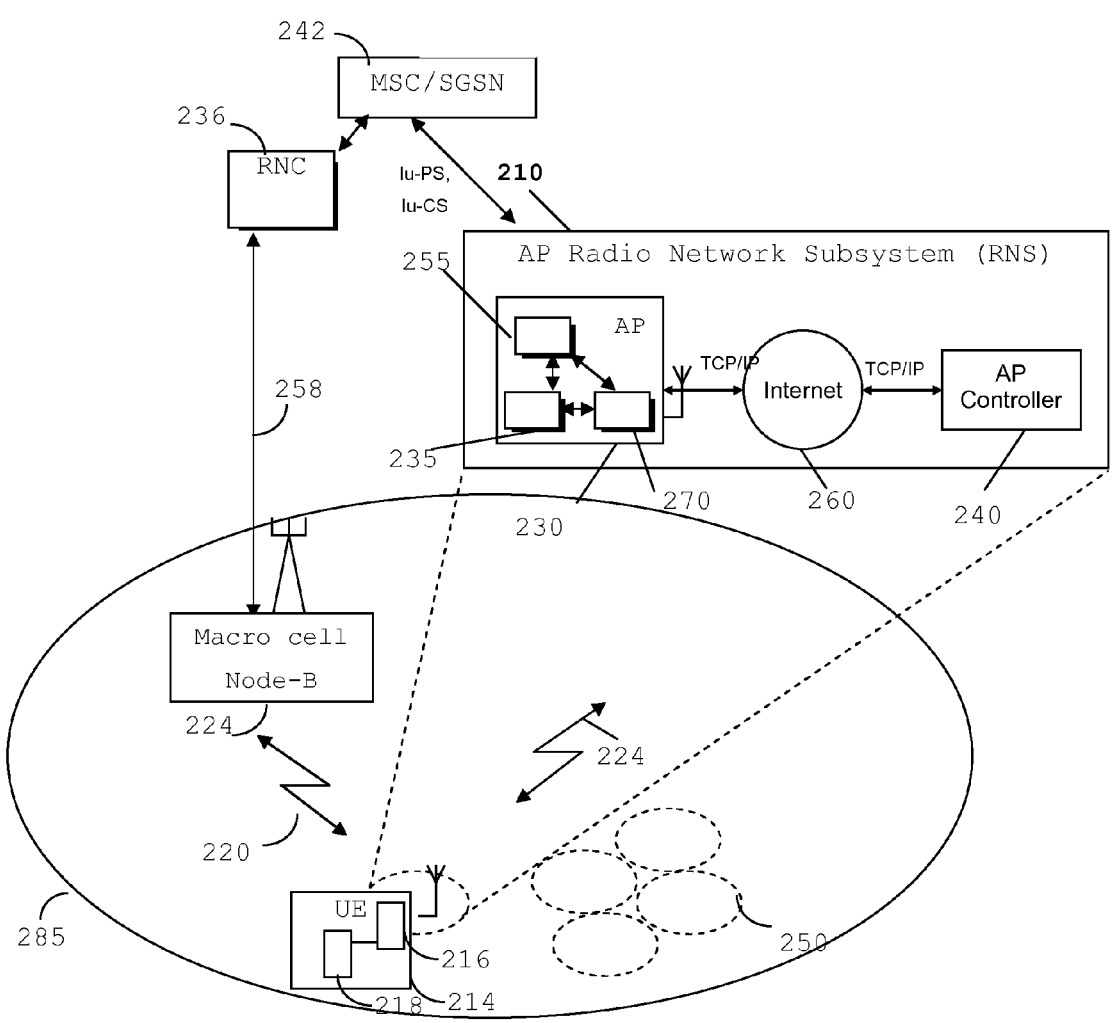

Embodiments of the invention will be described, by way of example only, with reference to the accompanying drawings, in which:

FIG. 2 illustrates an example of a cellular communication system that combines macro-cell and femto-cells, adapted in accordance with embodiments of the invention.

FIG. 3 illustrates a flowchart of a method for setting a power level in a wireless communication system that combines macro-cell and femto-cells, in accordance with embodiments of the invention.

FIG. 4 illustrates a typical computing system that may be employed to implement processing functionality in embodiments of the invention.

DETAILED DESCRIPTION OF EMBODIMENTS OF THE INVENTION

Embodiments of the invention find particular applicability in a cellular communication system that supports a number of overlapping communication coverage areas, for example a communication system that comprises a combination of femto cells and macro cells. In a femto cell network it is known that there may be a very large number of femto cells per macro cell. Thus, the coverage area of a single macro cell will inevitably overlap coverage area of a large number of femto cells.

Those skilled in the art, however, will recognize and appreciate that the specifics of this example are merely illustrative of some embodiments and that the teachings set forth herein are applicable in a variety of alternative settings. For example, since the teachings described hereafter do not depend on a particular cellular communication network conforming to any specific standard, it is envisaged that the teachings and inventive concept described herein can be applied to any type of cellular communication network, although a $3^{rd}$ generation partnership project (3GPP) network employing femto cell technology is shown in this embodiment. As such, other alternative implementations within cellular communication networks conforming to different standards are contemplated and are within the scope of the various teachings described.

Referring now to the drawings, and in particular FIG. 2, an example of part of a 3GPP network, adapted in accordance with some embodiments of the invention, is illustrated and indicated generally at 200. In FIG. 2, there is illustrated an example of a communication system 200 providing communication coverage in an area that combines macro cells 285 and femto cells 250 in accordance with one embodiment of the invention. For the embodiment illustrated in FIG. 2, the radio network sub-system (RNS) comprises two distinct architectures to handle the respective macro cell and femto cell communications. In the macro cell scenario, as known, the RNS comprises a radio network controller (RNC) 236 operably coupled to a network element 242, such as a serving GPRS support node (SGSN)/mobile switching centre (MSC), as known.

In a femto cell scenario, an AP RNS 210 comprises a network element in a form of an Access Point (AP) 230, and a controller in a form of an AP controller 240. As will be appreciated by a skilled artisan, an Access Point (AP) 230 is a communication element that facilitates access to a communication network via a communication cell, such as a femto-cell. One envisaged application is that an AP 230 may be purchased by a member of the public and installed in their home. The AP 230 may then be connected to an AP controller 240 over the owner's broadband internet connection 260.

Thus, an AP 230 is a scalable, multi-channel, two-way communication device that may be provided within, say, residential and commercial (e.g. office) locations, 'hotspots' etc, to extend or improve upon network coverage within those locations. Although there are no standard criteria for the functional components of an AP, an example of a typical AP for use within a 3GPP system may comprise some Node-B functionality and some aspects of radio network controller (RNC) 236 functionality, with the respective logical elements dependent upon the particular applications to be supported by the femto cell or prospective location in which the femto cell is going to be located. The AP communicates with UEs, such as UE 214, via a wireless interface (Uu).

The AP controller 240 may be coupled to a core network (CN) 242 via an Iu-PS and Iu-CS interface as shown. In this manner, the AP 230 is able to provide voice and data services to a cellular handset, such as UE 214, in a femto cell in contrast to the macro cell, in the same way as a conventional Node-B, but with the deployment simplicity of, for example, a Wireless Local Area Network (WLAN) access point.

In accordance with embodiments of the invention, a cellular communication system that combines macro-cell and femto-cells is configured to allow the femto cell to determine a power level, for example a P-CPICH power level, to use for wireless transmissions within its supported coverage area 250, that minimises the effect of femto cell transmissions on neighbouring macro or femto cells.

Algorithm 1: Initial Power Level Setting.

In accordance with one embodiment of the invention, at femto cell power-up, a femto cell AP receiver 235, sometimes referred to as an integrated network listen receiver (NWL), performs a frequency sweep over the relevant operational frequency bands of the femto cell, for example it is able to sweep over all $2^{nd}$ generation and $3^{rd}$ generation frequency bands in that region (noting that different regions may employ different frequency bands).

The femto cell AP 230 further comprises a signal processor 255 arranged to process the received signals from the frequency sweep performed by the receiver 235 and provide an estimate of a level of interference at each carrier. This estimate, as well as other quality criterion that may be provided to the femto cell AP 230 is/are utilized in the algorithm according to equation [1] below.

$$P_{P\text{-}CPICH} = \max(P_{P\text{-}CPICH,est1}, P_{P\text{-}CPICH,est2}) \quad [1]$$

In this manner, the maximum of two (or more) estimates is used to set the initial P-CPICH power. It is noteworthy that the proposed algorithm uses 2 criteria for initial CPICH power, although it is envisaged in other embodiments of the invention that alternative or additional criteria may be used. Furthermore, it is envisaged that the criteria may be changed by the operator.

In equation [1], the following criteria may be defined as: $P_{P\text{-}CPICHest1}$ is calculated according to:

$$P_{P\text{-}CPICH,est1} = \max\left(P_{P\text{-}CPICHmin}, \min\left(\frac{RSCP_{target}}{MAPL}, P_{P\text{-}CPICHmax}\right)\right) \quad [2]$$

$P_{P\text{-}CPICHest2}$ is calculated according to:

$$P_{P\text{-}CPICH,est2} = \max\left(P_{P\text{-}CPICHmin}, \min\left(\left(\frac{E_c}{N_0}\right)_{target} \times RSSI\right) / \left(MAPL \times \left(1 - \left(\frac{E_c}{N_0}\right)_{target}\right)\right), P_{P\text{-}CPICHmax}\right) \quad [3]$$

$(E_c/N_0)_{target}$ denotes the target Ec/N0 at the cell-edge;

MAPL denotes the maximum allowed path loss. In accordance with one embodiment of the invention, this factor is configurable;

$RSCP_{target}$ denotes the target Received Signal Code Power (RSCP) at the cell-edge. In accordance with one embodiment of the invention, this factor is configurable;

$P_{P\text{-}CPICHmin}$ and $P_{P\text{-}CPICHmax}$ denote the minimum and maximum allowed P-CPICH power levels respectively. In accordance with one embodiment of the invention, these factors are configurable; and RSSI denotes the wideband received signal strength indication (RSSI) of the signal power measured by the integrated network listen receiver.

In accordance with one embodiment of the invention, it is envisaged that one or more of the remaining configurable variables, marked as configurable above, may be supplied as input parameters. In the above equations, it is noteworthy that the variables are specified in a linear scale, as would be understood by a skilled artisan, as the form of the equation will change if the variables were specified in, say, a dB domain.

At system start-up the algorithm is used to calculate an initial power level of the P-CPICH. The aim of this first algorithm is to enable the femto cell AP 230 to transmit at a minimum RF power level that satisfies the quality criteria (specified in terms of target RSCP, target carrier to noise value ($E_c/N_0$) and coverage range), thereby minimizing interference caused to neighbouring macro/femto cells. The algorithm may also utilize RSSI measurements, as previously indicated, which may be obtained from the integrated network listen receiver. The value of the quality criteria may be configured by the Network Operator or femto cell AP manufacturer.

In one embodiment of the invention, the femto cell AP receiver 235 may only be utilized when there are no users in the system. In this embodiment, the normal receiver mode may be switched 'off', with no detriment to the user, as it may be applied, for example, in the middle of the night. It is envisaged that the RSSI measurements from the femto cell AP receiver 235 may be potentially biased, as macro cells are not fully loaded in the middle of the night. Further, the NWL measurements may be unreliable due to shadowing, for example the femto cell may be located adjacent an absorbing material.

As a result a further embodiment of the invention proposes a regular fine-tuning of the P-CPICH power based on UE measurements or pre-defined quality criteria, thereby adding diversity to the tuning process.

Algorithm 2: Power Level Fine-Tuning.

It is envisaged that the algorithm for fine-tuning may be carried out periodically or intermittently or in response to an event. It is also envisaged in some embodiments of the invention that possible events that may trigger use of the fine-tuning algorithm may include one or more of the following:

(i) A number of attempts made by un-authorized users to access the AP;

(ii) When the Ec/No, as transmitted by the AP, and returned in UE measurements, falls below a threshold;

(iii) When the RSCP of the AP, as returned in UE measurements, falls below threshold (iv) May be triggered by higher layer measurements at the AP, such as number of dropped calls increasing beyond threshold.

A skilled artisan will appreciate that a number of further trigger events may be used where a further fine-tuning process may benefit system efficiency and minimise interference cause by the femto cell. It is further envisaged that the configuration of periodicity, as well as the selection of trigger events, may be configured by the Network Operator or femto cell AP manufacturer. In this manner, self-optimization of the femto cell P-CPICH coverage, during normal operation of the femto cell AP, may be achieved.

The second (fine-tuning) algorithm utilizes RF measurement reports from the UEs that are connected to the femto cell (thereby implying authorized user access). As an example, UEs in a Cell_DCH state may be commanded to periodically report own-cell Ec/N0 measurements. In this manner, the use of own-cell measurements from connected UEs may then be used to improve reliability/quality of the femto cell coverage.

Thus, in one embodiment of the invention, the femto cell AP 320 commands/requests the connected UEs to report own-cell Ec/N0 measurements. These measurements are then stored and utilized, at the next iteration of the fine-tune algorithm, to calculate the $\Delta_i$ values according to equation [4] below;

$$\Delta_i = \left(\frac{E_c}{N_0}\right)_{meas} - \left(\frac{E_c}{N_0}\right)_{target} \quad [4]$$

Since fine-tuning is best performed frequently, the frequency sweep performed by the femto cell AP receiver (NWL) is not used in the fine-tuning process to avoid the frequency sweep being activated during normal hours. Thus, in one embodiment of the invention, the frequency sweep operation is performed daily, during inactive periods, whereas fine-tuning based on UE measurements is performed more frequently.

In an ideal scenario the femto cell AP transmitted signal should not radiate outside of the building in which it is located. This is to prevent access from unauthorized users. As a result, according to one embodiment of the invention, it is also envisaged that knowledge of "unauthorized user attempts" may also be used by the femto cell AP in the fine-tuning process. As an example the second algorithm may be executed if a number of attempts made by unauthorised users to access the femto cell reaches a specified threshold. Such events indicate potential RF radiation outside the building, and thereby indicate that a power level reduction should be implemented.

Thereafter, the P-CPICH power level for the femto cell AP may be adjusted in accordance with equation [5] below:

$$P_{P\text{-}CPICH,new} = \max(P_{P\text{-}CPICHmin}, \min(\{P_{P\text{-}CPICH,old} + \alpha \cdot \Delta_{step\text{-}up} - \beta \cdot \Delta_{step\text{-}down}\}, P_{P\text{-}CPICHmax})) \quad [5]$$

Where:

$\alpha=1$, if any negative value of $\Delta_i$ is reported, or $\alpha=0$, otherwise.

$\beta=1$, if $\Delta_{non\text{-}auth\ attempts} > \gamma_{non\text{-}auth\ attempts}$ or $\beta=0$, otherwise.

$\Delta_{step\text{-}down}$ denotes the step-down size in dB, $\Delta_{step\text{-}up}$ denotes a step-up size in dB, $\Delta_{non\text{-}auth\ attempts}$ denotes a number of attempts made by unauthorised users to access the femto cell since last iteration, $\gamma_{non\text{-}auth\ attempts}$ denotes a threshold for such events, $\alpha$ and $\beta$ are binary operators, and $P_{P\text{-}CPICH,old}$ denotes a P-CPICH power level (in dB) at the end of previous iteration.

Referring now to FIG. 3 there is illustrated a flowchart 300 for setting power levels, for example a P-CPICH power level in a cellular communication system that combines macro-cell and femto-cells, adapted in accordance with an embodiment of the invention. The flowchart commences in step 305 with the femto cell's access point (AP) (equivalent to the femto cell base station) being switched on. The AP receiver then performs a frequency sweep over relevant frequency bands, as shown in step 310. The AP may then optionally receive other femto cell quality criteria, say from a Network Operator, as shown in step 315.

The AP then calculates an initial P-CPICH to use, for example employing equation [1], as shown in step 320. The AP then uses the calculated P-CPICH level, which is calculated in order to minimize interference to neighbouring macro/femto cells, and transmits at this calculated P-CPICH power level, as shown in step 325.

Thereafter, either periodically, or in response to event trigger, the AP may request specific UE measurements, or use existing UE measurements that it has access to. Such periodic or intermittent measurements may then be used in a P-CPICH power level fine-tune process, as shown in step 335. A determination is then made, in step 345, as to whether the optimality criterion/criteria is/are met. If it is determined, in step 345, that the optimality criterion/criteria is/are met, the method loops back to step 335.

However, if it is determined, in step 345, that the optimality criterion/criteria is/are not met, the P-CPICH level is adjusted, in step 340. In this manner, the AP signal processor uses equation [5] to determine optimal P-CPICH power level, and adjusts it accordingly. Other common channel power settings, Cell reselection and Handover parameters may also be optimized. The method then loops back to step 335.

Hence, the process involves an iterative feedback loop, in order to determine whether a current P-CPICH power level is adequate to maintain desired cell coverage area, as shown in steps 340, 345 and 350. The P-CPICH power level is adjusted in step 350 if it is determined that the previously calculated P-CPICH power level is not adequate.

In this manner, embodiments of the invention describe a technique for the automatic tuning of the P-CPICH power level, for example in a femtocell, which is able to optionally take into account local RF conditions, quality criteria, as well as information about attempts made by non-authorised users to access the femto cell.

In one embodiment of the invention, it is envisaged that the aforementioned auto-tune process is used may be used to optimize other common channel power settings, with the auto-tuning process described in terms of P-CPICH for simplicity purposes only. For example, it is envisaged that the auto-tuning (initial and fine-tuning) process may be implemented to set or adjust other system power levels, including, but not limited to, acquisition indicator channel (AICH), paging indicator channel (PICH), cell selection/re-selection and handover parameters, e.g., Minimum Required Quality Level (Qqualmin), Minimum Required Received Level (Qrxlvemin).

It is envisaged that the aforementioned inventive concept aims to provide one or more of the following advantages:

(i) The inventive concept, in employing an improved P-CPICH power level, may be used to minimise interference created within the femto cell from affecting communications in neighbouring femto/micro/macro cells.

(ii) The inventive concept does not require new 3GPP messages to be adopted, say in the 3GPP standard, as it is able to re-use existing 3GPP messages to obtain UE specific measurements.

(iii) The inventive concept only requires supporting functionality to be provided within an Access Point, for example a femto cell AP.

(iv) The inventive concept does not require supporting functionality to be provided within the core network.

(v) The inventive concept facilitates self-optimization of the P-CPICH power level in a femto cell, which is desirable considering the envisaged large scale deployment, as well as plug-and-play behaviour.

(vi) The inventive concept facilitates self-optimization of the femto cell common channel power settings (e.g., AICH, PICH), cell selection/re-selection parameters, as well as handover parameters, as defined in 3GPP, TS 25.304, 'User Equipment (UE) procedures in idle mode and procedures for cell reselection in connected mode'.

FIG. 4 illustrates a typical computing system 400 that may be employed to implement processing functionality in embodiments of the invention. Computing systems of this type may be used in femto cell controllers, femto cell access points, UEs (in particular, processing logic in an femto cell AP that sets power levels within the cell). Those skilled in the relevant art will also recognize how to implement the invention using other computer systems or architectures. Computing system 400 may represent any type of special or general purpose computing device as may be desirable or appropriate for a given application or environment. Computing system 400 can include one or more processors, such as a processor 404. Processor 404 can be implemented using a general or special-purpose processing engine such as, for example, a microprocessor, microcontroller or other control logic. In this example, processor 404 is connected to a bus 402 or other communications medium.

Computing system 400 can also include a main memory 408, such as random access memory (RAM) or other dynamic memory, for storing information and instructions to be executed by processor 404. Main memory 408 also may be used for storing temporary variables or other intermediate information during execution of instructions to be executed by processor 404. Computing system 400 may likewise include a read only memory (ROM) or other static storage device coupled to bus 402 for storing static information and instructions for processor 404.

The computing system 400 may also include information storage system 410, which may include, for example, a media drive 412 and a removable storage interface 420. The media drive 412 may include a drive or other mechanism to support fixed or removable storage media, such as a hard disk drive, a floppy disk drive, a magnetic tape drive, an optical disk drive, a compact disc (CD) or digital video drive (DVD) read or write drive (R or RW), or other removable or fixed media drive. Storage media 418 may include, for example, a hard disk, floppy disk, magnetic tape, optical disk, CD or DVD, or other fixed or removable medium that is read by and written to by media drive 412. As these examples illustrate, the storage media 418 may include a computer-readable storage medium having particular computer software or data stored therein.

In alternative embodiments, information storage system 410 may include other similar components for allowing computer programs or other instructions or data to be loaded into computing system 400. Such components may include, for example, a removable storage unit 422 and an interface 420, such as a program cartridge and cartridge interface, a removable memory (for example, a flash memory or other removable memory module) and memory slot, and other removable storage units 422 and interfaces 420 that allow software and data to be transferred from the removable storage unit 418 to computing system 400.

Computing system 400 can also include a communications interface 424. Communications interface 424 can be used to allow software and data to be transferred between computing system 400 and external devices. Examples of communications interface 424 can include a modem, a network interface (such as an Ethernet or other NIC card), a communications port (such as for example, a universal serial bus (USB) port), a PCMCIA slot and card, etc. Software and data transferred via communications interface 424 are in the form of signals which can be electronic, electromagnetic, and optical or other signals capable of being received by communications interface 424. These signals are provided to communications interface 424 via a channel 428. This channel 428 may carry signals and may be implemented using a wireless medium, wire or cable, fiber optics, or other communications medium. Some examples of a channel include a phone line, a cellular phone link, an RF link, a network interface, a local or wide area network, and other communications channels.

In this document, the terms 'computer program product' 'computer-readable medium' and the like may be used generally to refer to media such as, for example, memory 408, storage device 418, or storage unit 422. These and other forms of computer-readable media may store one or more instructions for use by processor 404, to cause the processor to perform specified operations. Such instructions, generally referred to as 'computer program code' (which may be grouped in the form of computer programs or other groupings), when executed, enable the computing system 400 to perform functions of embodiments of the present invention. Note that the code may directly cause the processor to perform specified operations, be compiled to do so, and/or be combined with other software, hardware, and/or firmware elements (e.g., libraries for performing standard functions) to do so.

In an embodiment where the elements are implemented using software, the software may be stored in a computer-readable medium and loaded into computing system 400 using, for example, removable storage drive 44, drive 412 or communications interface 424. The control logic (in this example, software instructions or computer program code), when executed by the processor 404, causes the processor 404 to perform the functions of the invention as described herein.

It will be appreciated that, for clarity purposes, the above description has described embodiments of the invention with reference to different functional units and processors. However, it will be apparent that any suitable distribution of functionality between different functional units, processors or domains may be used without detracting from the invention. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

Aspects of the invention may be implemented in any suitable form including hardware, software, firmware or any combination of these. The invention may optionally be implemented, at least partly, as computer software running on one or more data processors and/or digital signal processors. Thus, the elements and components of an embodiment of the invention may be physically, functionally and logically implemented in any suitable way. Indeed, the functionality may be implemented in a single unit, in a plurality of units or as part of other functional units.

Although the invention has been described in connection with some embodiments, it is not intended to be limited to the specific form set forth herein. Rather, the scope of the present invention is limited only by the claims. Additionally, although a feature may appear to be described in connection with particular embodiments, one skilled in the art would recognize that various features of the described embodiments may be combined in accordance with the invention.

Furthermore, although individually listed, a plurality of means, elements or method steps may be implemented by, for example, a single unit or processor. Additionally, although individual features may be included in different claims, these may possibly be advantageously combined, and the inclusion in different claims does not imply that a combination of features is not feasible and/or advantageous. Also, the inclusion of a feature in one category of claims does not imply a limitation to this category, but rather the feature may be equally applicable to other claim categories, as appropriate.

Furthermore, the order of features in the claims does not imply any specific order in which the features must be performed and in particular the order of individual steps in a method claim does not imply that the steps must be performed in this order. Rather, the steps may be performed in any suitable order. In addition, singular references do not exclude a plurality. Thus, references to 'a', 'an', 'first', 'second', etc. do not preclude a plurality.

Thus, a network element, and method for setting a power level in a wireless communication system in a cellular communication system, for example one that combines macro-cell and femto-cells, has been described, which substantially addresses at least some of the shortcomings of past and present techniques and/or mechanisms.

The invention claimed is:

1. A network element for communicating with a wireless communication unit in a communication cell of a communication system, wherein the network element comprises:
a receiver arranged to receive at least one signal quality measurement from at least one wireless communication unit;
signal processing logic arranged to:
process the at least one signal quality measurement,
use a knowledge of a number of unauthorized attempts to access the communication system via the network element; and in response thereto determine whether a transmission at a transmit power level satisfies at least one predetermined quality criterion of the communication system and arrange for regularly tuning of a transmit power level of transmissions to a wireless communication unit at the determined transmit power level.

2. The network element of claim 1 wherein the regular tuning of a transmit power level of transmissions comprises at least one of:
periodically tuning a transmit power level;
intermittently tuning a transmit power level;
tuning a transmit power level in response to an event.

3. The network element of claim 1 wherein the network element further comprises a transmitter arranged to transmit a request to the wireless communication unit for the wireless communication unit to perform and transmit the at least one signal quality measurement to the network element.

4. The network element of claim 3 wherein the wireless communication unit is requested to transmit at least one signal-to-noise (Ec:No) measurement of a signal received in the communication cell supported by the network element.

5. The network element of claim 1 wherein the signal processing logic is arranged to determine whether a transmission at a transmit power level satisfies at least one predetermined quality criterion of the communication system based on calculating:

$$\Delta_i = \left(\frac{E_c}{N_0}\right)_{meas} - \left(\frac{E_c}{N_0}\right)_{target}.$$

6. The network element of claim 1 wherein the determined transmit power level is at least one of: a Primary Common Pilot Channel (P-CPICH) power level, an acquisition indicator channel (AICH), a paging indicator channel (PICH), cell selection parameter, cell re-selection parameter, Minimum Required Quality Level (Qqualmin), Minimum Required Received Level (Qrxlvemin), at least one handover parameter.

7. The network element of claim 1 wherein the network element supports communication in a femto cell that lies within a coverage area of a macro cell.

8. A method for setting a power level for transmissions in a communication cell of a cellular communication system, the method comprising:
receiving at least one signal quality measurement from at least one wireless communication unit operational in the cellular communication system;
processing the at least one signal quality measurement,
using a knowledge of a number of unauthorized attempts to access the communication system via the network element,
and in response to the processing and using,
determining whether a transmission at a transmit power level satisfies at least one predetermined quality criterion of the communication system; and
regularly tuning a transmit power level of transmissions to a wireless communication unit at the determined transmit power level.

9. A computer-readable storage element having computer-readable code stored thereon for setting a power level for transmissions in a communication cell of a cellular communication system, the computer-readable storage element comprising code for:
receiving at least one signal quality measurement from at least one wireless communication unit operational in the cellular communication system;
processing the at least one signal quality measurement, using a knowledge of a number of unauthorized attempts to access the communication system, and in response thereto:

determining whether a transmission at a transmit power level satisfies at least one predetermined quality criterion of the communication system; and regularly tuning a transmit power level of transmissions to a wireless communication unit at the determined transmit power level.

10. The computer-readable storage element of claim 9, wherein the computer readable storage medium comprises at least one of a hard disk, a CD-ROM, an optical storage device, a magnetic storage device, a ROM (Read Only Memory), a PROM (Programmable Read Only Memory), a EPROM (Erasable Programmable Read Only Memory), a EEPROM (Electrically Erasable Programmable Read Only Memory) and a Flash memory.

* * * * *